United States Patent [19]
Haggart
[11] Patent Number: 4,854,483
[45] Date of Patent: Aug. 8, 1989

[54] PACKAGES FOR CARBONATED BEVERAGES

[75] Inventor: John A. Haggart, Rugby, England
[73] Assignee: Corrugated Products Limited, United Kingdom

[21] Appl. No.: 167,365
[22] Filed: Mar. 14, 1988

Related U.S. Application Data

[63] Continuation-in-part of Ser. No. 831,472, Feb. 20, 1986, Pat. No. 4,771,918.

[30] Foreign Application Priority Data

Feb. 26, 1985 [GB] United Kingdom ................. 8504930

[51] Int. Cl.⁴ ...................... B65D 37/00; G01F 11/08; B67D 5/08
[52] U.S. Cl. ...................................... 222/95; 222/105; 222/209; 222/212; 222/326; 222/183; 222/386.5
[58] Field of Search .......................... 222/95, 105-107, 222/206, 215, 326, 386.5, , 183, 212, 209, 406, 407; 53/469-471; 220/254, 306

[56] References Cited

U.S. PATENT DOCUMENTS

| | | | |
|---|---|---|---|
| 2,109,549 | 3/1938 | Piquerez | 222/95 |
| 3,722,756 | 3/1973 | Cramer, Jr. | 222/212 |
| 3,876,115 | 4/1975 | Venus, Jr. et al. | 222/386.5 X |
| 3,981,415 | 9/1976 | Fowler et al. | 222/95 |
| 4,136,802 | 1/1979 | Mascia et al. | 222/95 |
| 4,222,499 | 9/1980 | Lee et al. | 222/215 X |
| 4,423,829 | 1/1984 | Katz | 222/215 X |
| 4,750,647 | 6/1988 | Cohen | 222/105 X |
| 4,771,918 | 9/1988 | Haggart | 222/95 |

*Primary Examiner*—Joseph J. Rolla
*Assistant Examiner*—Mona C. Beegle
*Attorney, Agent, or Firm*—W. Thad Adams, III

[57] ABSTRACT

A container for carbonated beverages has an outer casing for containing a collapsible bag with a tap in which the beverage is stored and a resilient diaphragm surrounding the bag and urging it at all times towards an end closure member through which the tap of the bag projects, the diaphragm exerting a substantially constant pressure on the bag irrespective of its volume.

9 Claims, 3 Drawing Sheets

PACKAGES FOR CARBONATED BEVERAGES

Figure 1A:
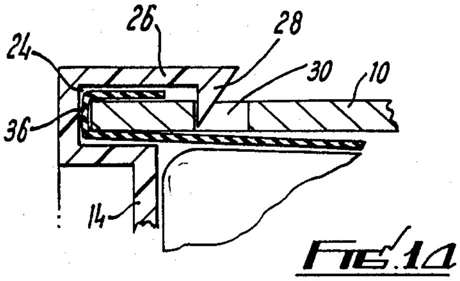

This Application is a continuation-in-part of Application Ser. No. 831,472 filed Feb. 20, 1986, now U.S. Pat. No. 4,771,918.

The present invention concerns improvements in or relating to packages for beverages, especially but not exclusively packages for carbonated beverages, for example beer, sparkling wine and carbonated soft drinks.

The term "carbonated beverages or liquids" when used herein is intended to cover all liquids having one or more gases, for example carbon dioxide or nitrogen dissolved therein.

There have been attempts in the past to utilize the "bag-in-box" technique to package beer. A bag-in-box package is normally a plastics material container for the liquid to be dispensed which is retained in a relatively rigid cardboard or corrugated paper outer container. Such packages have proved to be acceptable in the past for the dispensing of non-carbonated liquids, for example wine and milk, but a problem has arisen when attempts have been made to dispense carbonated beverages, that is liquids having carbon dioxide gas dissolved therein, due to the fact that after some liquid has been dispensed the consequent reduction in pressure of the stored liquid allows gas to escape from solution so that subsequent liquid dispensed has a reduced gas content, in other words it is "flat". In one prior attempt to overcome this problem there has been provided a bag-in-box container having mechanical means operable after a quantity of liquid has been dispensed to ensure that pressure on the remaining contents is maintained.

This has proved to be somewhat disadvantageous in that not only does it require the user to take physical steps after dispensing liquid but also has resulted in a complicated and consequently costly container.

It is an object of the present invention to obviate or mitigate these disadvantages.

According to one aspect of the present invention there is provided a container for liquids including a tubular outer casing, a bag for the liquid within the casing said bag having a dispensing tap which in use projects from the casing, end members for the casing and a diaphragm of resilient material fixed at or near one end of the casing and extending thereacross to trap the bag between itself and one end member whereby the diaphragm exerts a pressure on the bag and its contents at all stages as the bag is emptied.

Preferably the diaphragm is manufactured from an elastomeric material which exerts a force on the bag which is approximately constant irrespective of the degree to which the diaphragm is stretched.

Preferably the diaphragm is flat in its undeformed state but may be dome-shaped.

Preferably the edge of the diaphragm is trapped between said one end member and the end of the tubular casing.

Preferably the bag is made from a gas impervious material.

Preferably said one end member is manufactured from plastics by an injection moulding or other suitable technique and has means formed integrally therewith to locate and lock it in its fitted position on the casing. Preferably said locking means are inwardly directed detent members equispaced around the periphery of a lip of the end member intended to engage corresponding recesses or apertures in the casing near its end. Alternatively said locking means is an inwardly directed resilient flange on the end member intended to engage a circumferential groove formed in the casing near its end.

Preferably said one portion of the end member is a ring and said other portion a disc connectable to said ring.

Preferably the other end member is formed integrally with the casing. The other end member or the casing close to it may have passages therethrough.

Preferably the tubular casing is cylinder in cross-section and is manufactured from spirally wound cardboard strips. Alternatively it may be cylindrical and, with its integral other end member may be formed from plastics material. Preferably it is blow moulded.

According to a further aspect of the present invention there is provided a container for liquids including an outer tubular casing, a bag for the liquid within the casing, said bag having a dispensing tap which in use projects from the casing, end members for the casing and a diaphragm attached at its edges to the casing at or near one of its ends with the bag interposed between the diaphragm and one end member, the volume of the casing being at least 10 percent greater than the volume of a full bag at ambient filling conditions.

The term "ambient filling conditions" used in the preceding paragraph is intended to mean the pressure and temperature of the liquid when a filled bag is first packed in a casing or alternatively when a bag within the casing is first filled.

Preferably the volume of container is greater than the volume of the filled bag by a factor of 30 percent.

According to a further aspect of the present invention there is provided a method for packing a container for liquids of the type including an outer tubular casing, a bay for the liquid within the casing, end members for the casing and a diaphragm fixed at its periphery at or near one end of the casing, the method comprising presenting the casing with an end member fitted thereto to a station for inserting a filled bag in the casing, applying subatmospheric pressure to the interior of the casing on the side of the diaphragm remote from the side intended in use to abut the bag until the withdrawn diaphragm defines a volume within the casing which is greater than the volume of the filled bag and thereafter placing the filled bag within the casing, fitting an end member to the open and of the casing and allowing the pressure within the casing to return to atmospheric.

Figure 1:
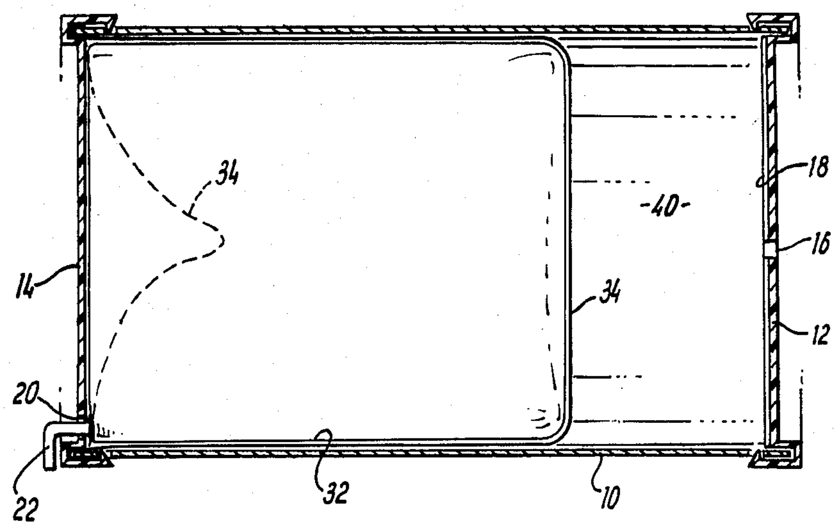
Figure 2A:
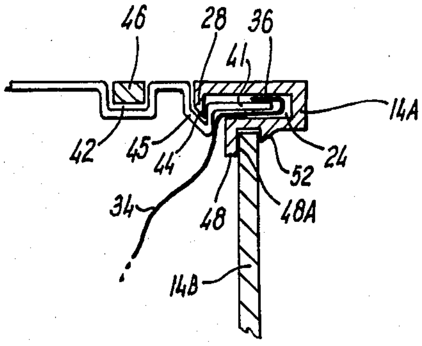
Figure 2:
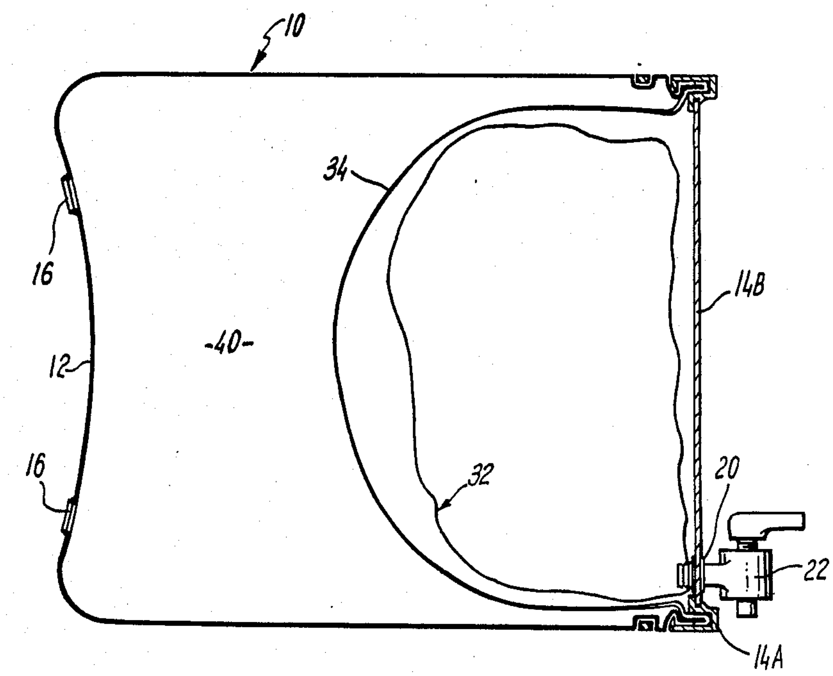
Figure 3:
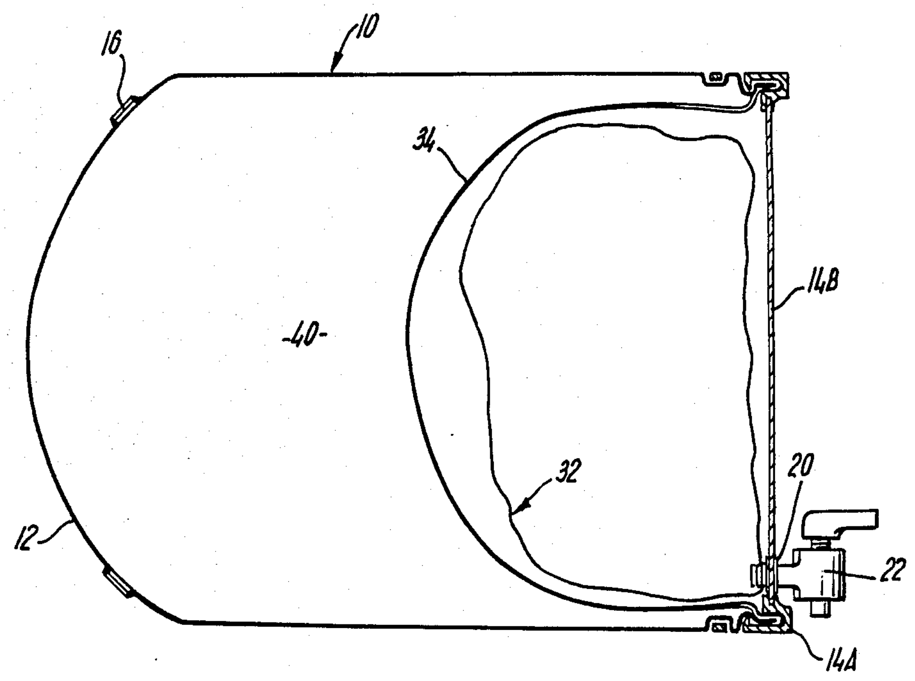

An embodiment of the present invention will now be described by way of example only with reference to the accompanying drawings in which:

FIGS. 1 and 1*a* show respectively diagrammatically a longitudinal cross-section through a container for carbonated liquids and a detail thereof;

FIGS. 2 and 2*a* show respectively similar views of a modified container; and FIG. 3 shows a similar view to FIG. 1 of a further modified container.

A container for storing, transporting and dispensing beer, normally in a domestic situation, and adapted to contain, for example, 5 liters of beer, comprises a tubular outer casing 10 conveniently of circular cross-section and manufactured from spirally wound paper. The casing 10 is provided with end members or caps 12, 14 manufactured from plastics material, suitably by injection moulding. One end cap 12 has an aperture 16 therethrough and a plurality of radially extending grooves 18 formed in its inner face. A similar arrangement can be provided on the other end cap 14 but this is not essential. However, the other end cap 14 is provided with an aperture 20 near its edge through which a dispensing tap 22 may project in use. Each end cap may be provided with similar means for ensuring that after fitment it remains firmly in place on the end of the casing 10 and the detail of the drawing best illustrates these means.

The end cap 14 is provided with a peripheral groove 24 intended to receive the end of the casing 10 (and in the case of this end cap another member, to be described below). The outer inwardly directed flange 26 of the end cap is provided at equispaced intervals around its periphery with detents 28 having a saw-tooth profile, the sloping face of the profile being on the inward side of the detent, that is the side remote from the casing end in the in use condition. A corresponding series of apertures 30 are formed through the casing 10 at an appropriate distance from the end of the casing so that as the end cap is pushed onto the end of the casing the outer flange 2 6 is deflected outwardly as the apices of the detents move over the outer surface of the casing until they encounter the apertures 30 at which they spring inwardly as a result of the resilience of the flange so that the flat face of the detent engages the end of the aperture adjacent to the end of the casing thereby retaining the end cap in place.

The casing is intended to house an impervious plastics material bag 32 containing beer or some other beverage having carbon dioxide gas and perhaps nitrogen dissolved therein. The bag 32 is provided with the tap 22 described above so that its contents may be dispensed at will.

It will be realised that as carbonated liquid is dispensed from the bag if the volume of the bag is not correspondingly reduced then due to the reduction in pressure dissolved carbon dioxide will be released from the liquid so that liquid subsequently dispensed will have a reduced carbon dioxide content and, of course, this is undesirable as gives rise to a "flat" beverage.

To ensure that the volume of the bag is reduced automatically by an appropriate amount when some of its contents are dispensed a resilient synthetic rubber diaphragm 34 is fitted across one end of the casing. In its undeformed state the diaphragm is flat or dome-shaped and the material from which it is manufactured is chosen such that irrespective of the degree of stretch of the diaphragm the force tending to return it to its undeformed condition remains approximately constant. The diaphragm is designed to exert a pressure on the bag greater than or equal to the pressure exerted by the gas within the liquid, at normal ambient temperatures (17°-20° C.).

The diaphragm has its peripheral edge 36 rolled over the end of the casing as can be best illustrated in the detail drawing. It will be realised therefore that it surrounds the bag on all sides except that side abutting the end cap 14 so that as liquid is dispensed it tends to return to its original undeformed condition to reduce the volume of the bag by an amount equal to that dispensed thereby preventing the escape of gas from the carbonated liquid. In use, the peripheral edge 36 of the diaphragm is fixed to the end of the casing 10 by the sandwiching action of the peripheral groove 24 on the end cap 14. Alternative fixing means are operative during the filling of the container and these will be described below.

The present invention appreciates that as the temperature of the carbonated liquid rises there is a corresponding increase in pressure and even in normal operating conditions experienced in temperate countries this rise in pressure can become sufficiently great to pose a serious risk of explosion.

If the container was made sufficiently rigid to contain the highest pressure normally expected to be encountered and was designed with an additional safety factor it would be so robust that not only would its cost be prohibited but also it would be too heavy for normal handling operations.

The invention makes use of the unique qualities of the diaphragm 34 to obviate this problem. The volume of the container 10 is so chosen that it is at least 10 percent greater than the volume of the bag of carbonated liquid when the bag is inserted into the casing at ambient filling condition.

Conveniently the oversize is 30 percent and the drawing shows a void 40 at the end of the container remote from the end cap 14 when a filled bag (as illustrated in the drawing) is accommodated within the container at filling pressure and temperature. The volume of the void is thus chosen such that expansion of the bag and its contents, as a result of a temperature rise up to close to the highest temperature expected to be encountered are permitted. During this expansion the pressure of the contents of the bag remain substantially constant and any additional rise in temperature over maximum normally expected does cause an increase in pressure but this increase in pressure can be coped with by the inherent strength of the bag, diaphragm and casing.

The invention recognises that it is important that the bag is fitted to the container and diaphragm assembly in a particular manner. If one considers a partially filled plastics material bag which is contained by a diaphragm-like object it will be realised that the bag must fold to take up its "over volume". These folds will be trapped against the diaphragm and if there is a subsequent increase in the volume of the contents of the bag due, for example, to a temperature increase, the folds find considerable difficulty in freeing themselves as a result of the frictional forces between the bag at the folds and the diaphragm alongside the folds. This could lead to fracture of the bag.

It is important, therefore, that if there are any folds in the bag at filling these are located in regions thereof remote from the end cap 14.

Thus according to the present invention the method of inserting a filled bag into an outer casing comprises taking an outer casing 10 with an end cap 12 and diaphragm 34 fitted thereto and applying a subatmospheric pressure by way of the aperture 16 in the end cap 12 to the interior of the container. The fact that the periphery of the diaphragm is wrapped around the other end of the container 10 provides a sufficient seal and causes the diaphragm to be pulled from the position shown in dotted lines in the drawing to a position where it "coats" the interior surface of the container 10 and the end cap 12, the grooves 18 in the inner surface of the end cap 12 allowing even distribution of the reduced pressure. A filled bag can then be placed into the container and the end cap 14 fitted to the other end of the container prior to the release of the sub-atmospheric pressure which allows the diaphragm to return to the position shown in the drawing. Clearly a method of this type is suitable in an automated filling operation.

Conveniently the bag is filled with beer at subambient temperature as this ensures that gas is maintained in its dissolved state.

Various modifications can be made without departing from the scope of the invention, for example the casing need not be cylindrical nor need it be manufactured from spirally wound strips. It could, for example, be square or rectangular in cross-section and manufactured from corrugated paper. It could also be manufactured from plastics material as shown in FIG. 2 in which components of the modification shown in FIG. 2 identical with or similar to those of FIG. 1 have been given the same reference numerals.

The bag, in a further modification, need not be manufactured from a gas-impervious material and the diaphragm could be formed from natural rubber, thermosetting elastomer or any other suitable material.

In this modification the tubular outer casing 10 has the end member 12 formed integrally therewith suitably from plastics material utilising a blow moulding technique. The other end of the casing 10 has an opening 41 of a diameter slightly less than the diameter of the casing which terminates in an inwardly directed peripheral groove 44 having an inclined base 45. A further peripheral groove 42 is provided in the casing spaced from the groove 44. The end member 14 of this modification comprises a number of components including an outer ring 14A having a circular groove 24 and an inwardly directed flange 28 extending over the mouth of the groove but spaced therefrom. A further flange 48, again inwardly directed, extends from the ring 14A on the opposite side of the slot 24. The flange 28 has an inclined end corresponding to the inclined base of groove 44 and the flange 48 has a surface 48A parallel to the casing opening. A sawtooth configuration ridge extends around the inner surface of the ring 14A, spaced from the surface 48A. The diaphragm 34 is placed across the groove 24 of the ring 14A and the casing end is pushed into the groove by mechanical means engaging in groove 42 until the flange 28 engages in the groove 44 to provide permanent fixing. The diaphragm 34 is then drawn down into the container by applying sub-atmospheric pressure through apertures 16. When a sufficient volume with the extended diaphragm has been created a filled bag with a dispensing tap 22 fitted in an end disc 14B is presented to the casing, the disc 14B is snap fitted under the ridge 52 with its inner surface resting on the flange surface 48A and the vacuum released. A carrying handle 46 may then be fitted in the groove 42. The ridge 52 may be replaced, in a modification of this embodiment, by a bayonet type fixing.

In a further modification the end caps can have any suitable shape and means for fixing them to the casing. Various alternative bag and tap arrangements can be employed and the diaphragm can have a different initial shape. The means for attaching the diaphragm to the casing can be modified, for example it could be glued to the inner surface of the casing at or near one end thereof. The liquid in the bag need not be beer. It may be sparkling wine, or aerated water or a carbonated soft drink. Indeed it need not necessarily be carbonated. The container could contain a viscous liquid, for example, a sauce to be dispensed in unit doses. The viscosity of the liquid hinders its egress from the tap in normal circumstances but the pressure exerted on the bag by the diaphragm assists in dispensing. Additionally it provides a liquid to be dispensed which has an over-atmospheric pressure and this can be utilised in a measuring valve which would normally require a return spring. With the proposed container the internal pressure of the liquid enables the expensive spring to be dispensed with. Obviously the liquid need not be highly viscous. A liquid of normal viscosity to be dispensed by a measuring valve in unit doses may be used.

FIG. 3 shows a further modification in which the outer casing 10 is made from a non-rigid plastics material for example High Density Polyethylene or a Polypropylene/High Density Polyethylene mix. The diaphragm 34 is made from a natural or synthetic rubber which provides a force on the bag 32 which is approximately constant at up to six times stretch ratio and preferably an eight times stretch ratio. The diaphragm 34 is sufficiently elastic that it substantially defines the shape adopted by the bag 32 when full, and when empty it lies substantially flat.

It has been found that for the bag to empty satisfactorily the ratio of the area of the unstretched diaphragm to the internal surface area of the casing should be between 1:4 and 1:6, and preferably is in the order of 1:5.5.

The outer casing 10 has because of its shape, positive pressure resistance and virtually no negative pressure resistance, i.e. it is resistant to explosive forces but not implosive forces. Using the above materials for the container permits the use of low cost blow moulding, considerably reducing the cost of the container.

Instead of having a single central aperture 16 in the end member 12, a plurality of apertures 16 are provided therein adjacent the perimeter thereof. The end member 12 may be outwardly domed as shown in FIG. 3, or alternatively it may be inwardly domed or substantially flat.

The filling method described earlier herein is employed in general terms to fill a non-rigid container, but in addition the opposite end of the container to the end member 12 is hermetically fitted across the end of a chamber in the filling machine. Sub-atmospheric pressure is produced in the chamber by suction causing the diaphragm to be pulled towards the end member 12. A filled bag can then be placed into the container and the end cap 14 fitted prior to the release of the sub-atmospheric pressure. Reducing the pressure in the chamber rather than just in the container, means that there is substantially no pressure drop across the casing walls and collapse thereof is thus prevented.

I claim:

1. A container for liquids comprising:
(a) a tubular outer casing;
(b) a bag for the liquid within the casing, said bag having a pouring tap which in use projects from the casing;
(c) end members for the casing, at least one of which end members is separable but fixed in use to the casing and has such dimensions that a filled bag may pass through the casing end closable by a separable end member; and
(d) a diaphragm of resilient material which is flat when undeformed and is fixed at or near said end of the casing and extends across the end of the casing to trap the bag between itself and the separable end member, the dimensions of the casing having a ratio of the area of the diaphragm when undeformed to the internal surface area of the casing of between 1:4 and 1:6 for exerting a pressure on the bag at all stages as the bag is emptied and returning substantially to its undeformed state when the bag is empty.

2. A container for liquids, comprising:

(a) a tubular outer casing;

(b) a bag for the liquid within the casing, said bag having a pouring tap which in use projects from the casing;

(c) end members for the casing, at least one of which end members is separable but fixed in use to the casing and has such dimensions that a filled bag may pass through the casing end closable by a separable end member; and (d) a diaphragm of resilient material which is dome-shaped when undeformed and is fixed at or near said end of the casing extending across the end of the casing to trap the bag between itself and the separable end member, the dimensions of the casing having a ratio of the area of the diaphragm when undeformed to the internal surface area of the casing of between 1:4 and 1:6, for exerting a pressure on the bag at all stages as the bag is emptied and returning substantially to its undeformed state when the bag is empty.

3. A container for liquids as claimed in claim 1, in which the diaphragm is manufactured from an elastomeric material which exerts a substantially constant force on the bag when stretched up to six times its original size, whereby the diaphragm may be made to be flat when undeformed.

4. A container for liquids as claimed in claim 3, in which the diaphragm is manufactured from an elastomeric material which exerts a substantially constant force on the bag when stretched up to eight times its original size.

5. A container for liquids as claimed in claim 1 or claim 2, in which the casing is formed from a non-rigid material, and the material of the diaphragm is such that the form adopted by a full inserted bag is substantially dictated by the diaphragm.

6. A container for liquids as claimed in claim 5, in which the casing is shaped to have positive internal pressure resistance but substantially no negative internal pressure resistance, whereby the casing is resistant to explosive forces but no implosive forces.

7. A container for liquids as claimed in claim 5, in which the casing is formed from a non-rigid plastics material.

8. A container for liquids as claimed in claim 5, in which the casing is formed from high density polyethylene.

9. A container for liquids as claimed in claim 5, in which the casing is formed from a polypropylene/high density polyethylene mix.

* * * * *